United States Patent [19]

Saito et al.

[11] Patent Number: 4,610,230

[45] Date of Patent: Sep. 9, 1986

[54] THROTTLE CONTROL APPARATUS

[75] Inventors: Hiroshi Saito, Tokyo; Hideaki Nebu; Tsuneaki Sakamoto, both of Shiki; Tomoyasu Tanino, Asaka, all of Japan

[73] Assignee: Honda Giken Kogyo Kabushiki Kaisha, Tokyo, Japan

[21] Appl. No.: 745,013

[22] Filed: Jun. 14, 1985

[30] Foreign Application Priority Data

Jun. 15, 1984 [JP] Japan ................................ 59-123394

[51] Int. Cl.$^4$ ........................................... F02D 11/02
[52] U.S. Cl. .................................... 123/360; 123/378
[58] Field of Search ............... 123/350, 352, 360, 361, 123/378, 198 D; 180/175–178

[56] References Cited

U.S. PATENT DOCUMENTS

| 3,978,837 | 9/1976 | Lundberg | 123/360 |
| 4,245,713 | 1/1981 | Mochida et al. | 180/176 |
| 4,513,836 | 4/1985 | Treadwell | 123/360 |
| 4,543,932 | 10/1985 | Sturdy | 123/361 |
| 4,559,912 | 12/1985 | Larom et al. | 123/361 |

Primary Examiner—William A. Cuchlinski, Jr.

Attorney, Agent, or Firm—Lyon & Lyon

[57] ABSTRACT

A throttle control apparatus for an internal combustion engine for a motor cycle, comprising a manually operated rotatable throttle actuating grip member, a first linkage cable for providing driving connection selectively in one of two opposite directions from the grip member to the engine throttle valve, a control circuit for producing a control signal when actuated, drive means responsive to the control signal for producing a driving force in one direction, a throttle regulator unit for providing driving connection from the drive means to the throttle valve, and a second linkage cable for transmitting the driving force to the throttle regulator unit. One of the first and second linkage cables is operative to produce a mechanical stress such as typically a lengthwise compressive force therein with the throttle actuating grip member manually operated to provide driving connection to the throttle valve in one of the aforesaid opposite directions through the first linkage cable, wherein a switch device is provided which includes a movable member movable in response to the mechanical stress for producing a signal effective to disable the control signal from the control circuit.

5 Claims, 4 Drawing Figures

THROTTLE CONTROL APPARATUS

FIELD OF THE INVENTION

The present invention relates to a throttle control apparatus for use with an internal combustion engine of a two-wheeled or three-wheeled powered vehicle such as, typically, a motorcycle.

BACKGROUND OF THE INVENTION

An internal combustion engine for an uptodated motorcycle is provided with an apparatus which is designed to maintain constant the power output of the engine and accordingly the vehicle speed when desired by the vehicle driver. Such an apparatus serves to save the vehicle driver from fatigue and to lessen the fuel consumption rate of the engine by minimizing changes in the vehicle speed during cruising of the motorcycle. An existing throttle control apparatus of this nature is usually actuated from a manually operated switch and is made inoperative when the switch is reset by the vehicle driver. It is however desirable that the apparatus be disabled without having recourse to the driver's action on the switch. An object of the present invention is to provide an improved throttle control apparatus which can be made inoperative without such a driver's extra action.

SUMMARY OF THE INVENTION

In accordance with the present invention, there is provided a throttle control apparatus for an internal combustion engine for a powered vehicle having in the internal combustion engine an induction system including a throttle valve therein, comprising manually operated first throttle valve actuating means rotatable in either direction about an axis fixed with respect to the vehicle body; first linkage means for providing driving connection selectively in one of two opposite directions from the throttle valve actuating means to the throttle valve; a control circuit for producing a control signal when actuated; drive means responsive to the aforesaid control signal for producing a driving force in one direction; second throttle valve actuating means for providing driving connection from the drive means to the throttle valve; second linkage means for transmitting the driving force to the second throttle valve actuating means, one of the first and second linkage means being operative to produce a mechanical stress therein with the first throttle valve actuating means manually operated to provide driving connection to the throttle valve in one of the aforesaid opposite directions through the first linkage means; and switch means including a movable member movable in response to the mechanical stress for producing a signal effective to disable the aforesaid control signal from the control circuit.

BRIEF DESCRIPTION OF THE DRAWINGS

The features and advantages of a throttle control apparatus according to the present invention will be more clearly appreciated from the following description taken in conjunction with the accompanying drawings in which.

DESCRIPTION OF THE PREFERRED EMBODIMENTS

Figure 1:
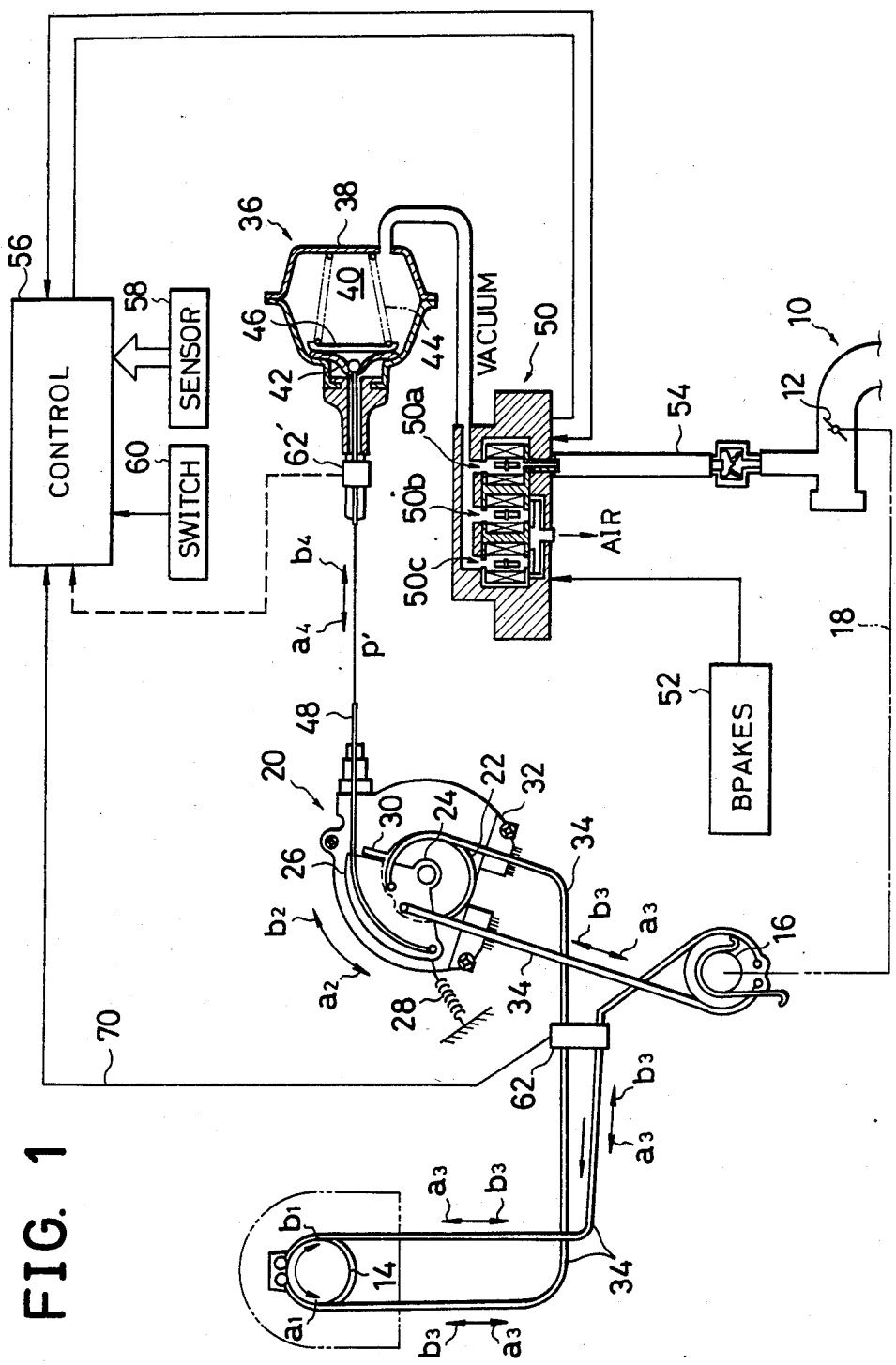
FIG. 1 is a schematic view showing, partly in section, a preferred embodiment of a throttle control apparatus according to the present invention.

A throttle control apparatus embodying the present invention is provided on an internal combustion engine for use typically on a motorcycle (hereinafter referred to as vehicle). In FIG. 1 of the drawings, such an internal combustion engine is shown comprising an induction system 10 including an intake manifold 10 and a throttle valve 12. As well known in the art, the intake manifold leads to the combustion chamber of a single power cylinder or each of two or more power cylinders past an intake valve, though not shown in the drawings. The throttle valve 12 is provided in the intake manifold 10 and is pivotally movable between positions producing minimum and maximum flow rates past the valve 12, as is also well known in the art.

The throttle control apparatus embodying the present invention is used to control the degree of opening of such a throttle valve and comprises a manually operated first throttle valve actuating means rotatable in either direction about an axis fixed with respect to the vehicle body. The first throttle valve actuating means comprises a throttle-control grip member 14 which is typically mounted on one of the steering handles (not shown) of the vehicle by means of a suitable shaft. The throttle-control grip member 14 is manually operated to control the opening degree of the throttle valve 12 and is rotatable about its center axis with respect to the vehicle body. In the embodiment herein shown, the grip member 14 is assumed to be rotatable in a direction of arrow $a_1$ to reduce the degree of opening and a direction of arrow $b_1$ to increase the opening degree of the throttle valve 12. As the opening degree of the throttle valve 12 is reduced and increased, the engine power output and accordingly the vehicle speed are reduced and increased, respectively.

The throttle control apparatus embodying the present invention further comprises a throttle drive member 16 which is mounted on the vehicle body and which is located in association with the throttle-control grip member 14 and the throttle valve 12 of the engine. The throttle drive member 16 is also rotatable about its center axis with respect to the vehicle body and is connected to the throttle valve 12 of the engine by means of a suitable mechanical linkage 18 which is schematically shown by a dots-and-dash line. The throttle drive member 16 is adapted to transmit the rotation of the throttle-control grip member 14 to the throttle valve 12 through the linkage 18 to causes the valve 12 to turn in the directions to reduce and increase its degree of opening when the throttle-control grip member 14 is rotated in the directions of arrows $a_1$ and $b_1$, respectively.

When the engine is to operate in a constant power output mode, the throttle valve 12 is driven to turn by a force which is transmitted to the throttle drive member 16 through second throttle valve actuating means for providing driving connection from the drive unit 36 to the throttle valve 12. In the embodiment shown in FIG. 1, such second throttle valve actuating means comprises a throttle regulator unit 20 including a first regulating member 22 rotatable on a pivot shaft 24 secured to the vehicle body. In association with this first regulating member 22 is positioned a second regulating member 26 which is rotatable on the pivot shaft 24 with respect to, viz., independently of the first regulating member 22. The second regulating member 26 is herein assumed to be shaped in the form of a sector and is urged by suitable biasing means to turn about the center axis of the shaft 24 counterclockwise in FIG. 1 as indicated by arrow $a_2$. The biasing means is herein assumed to comprise a helical tension spring 28 which is anchored at one end to the vehicle body and at the other to one side edge position of the second regulating member 26 as shown. The first regulating member 22 has a lug portion 30 projecting radially away from the center axis of the shaft 24 and engageable with the other edge portion of the second regulating member 26. The lug portion 30 serves as a stop member for the second regulating member 26, inhibiting the second regulating member 26 from turning in the direction of arrow $b_2$ beyond a predetermined angular position with respect to the first regulating member 22 against the force of the spring 28, as will be understood as the description proceeds. The first regulating member 22 and second regulating member 26 are enclosed within a casing 32 fixedly supported on the vehicle body.

Figure 2:
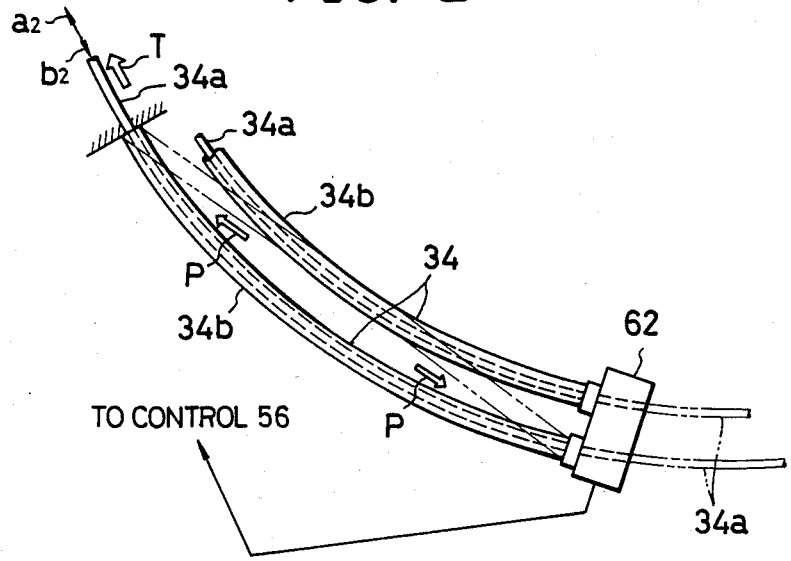
FIG. 2 is a plan view showing the arrangement of portions of a first linkage cable which forms part of the apparatus embodying the present invention.

The throttle-control grip member 14, throttle drive member 16 and first regulating member 22 as above described are interconnected by first linkage means for providing driving connection selectively in one of two opposite directions from the throttle-control grip member 14 to the throttle valve 12. In the embodiment shown in FIG. 1, such first linkage means comprises an endless, flexible first linkage cable 34 which also forms part of the throttle control apparatus embodying the present invention. Though endless in effect, the first linkage cable 34 provided in the shown embodiment is assumed to consist of, for example, three discrete sections. A first section is anchored at one end to the throttle-control grip member 14 and at the other to the throttle drive member 16. A second section of the linkage cable 34 is anchored at one end to the throttle-control grip member 14 and at the other to the first regulating member 22. A third section is anchored at one end to the first regulating member 22 and at the other to the throttle drive member 16. The linkage cable 34 as a whole is thus lengthwise movable between the throttle-control grip member 14, throttle drive member 16 and first regulating member 22 in first and second directions to follow the rotation of the throttle-control grip member 14 in the directions of the arrows $a_1$ and $b_1$ as indicated by arrows $a_3$ and $b_3$. As shown in FIG. 2, each of the sections of the linkage cable 34 comprises an inner flexible and lengthwise non-deformable line member or wire cable 34a, and an outer flexible and lengthwise deformable line member or tube 34b covering the wire cable throughout the length of each section. The wire cable 34a of each section of the linkage cable 34 is kept taught between its opposite ends and the outer tube 34b is lengthwise slidable on the inner wire cable 34a although both are secured at their opposite ends to any two of the throttle-control grip member 14, throttle drive member 16 and first regulating member 22.

The throttle control apparatus embodying the present invention further comprises drive means which comprises a vacuum-operated drive unit 36. The drive unit 36 comprises an actuator housing 38 which defines a vacuum chamber 40 sealed by a flexible diaphragm 42 secured to the housing 38. The diaphragm 42 is urged to deform in a direction to expand the chamber 42 by suitable biasing means. This biasing means is shown comprising a helical compression spring 44 which is located within the chamber 40 and which is seated at one end on an end wall of the housing 38 and at the other on a spring retainer plate 46 received on the inner face of the diaphragm 42. The housing 38 is securely mounted on the vehicle body by appropriate means.

The diaphragm 42 of the drive unit 36 is connected to the second regulating member 26 of the throttle regulator unit 20 by second linkage means for transmitting the driving force from the drive unit 36 to the throttle regulator unit 20 serving as the second throttle valve actuating means. In the embodiment herein shown, such second linkage means comprises a second linkage cable 48 which is composed similarly to the first linkage cable 34. The second linkage cable 48 thus comprises an inner flexible and lengthwise non-deformable line member or wire cable, and an outer flexible and lengthwise deformable line member or tube slidably covering the wire cable throughout the length of each section. The linkage cable 48 is anchored at one end to the diaphragm 42 and at the other to the second regulating member 26 and is thus caused to lengthwise travel in opposite directions as indicated by arrows $a_4$ and $b_4$ as the first linkage cable 34 is caused to travel in the directions of arrows $a_3$ and $b_3$. The diaphragm 42 of the drive unit 36 is forced to deform in the direction to expand the vacuum chamber 40 when the second linkage cable 48 is caused to travel in the direction of the arrow $a_4$. As will be understood as the description proceeds, the drive unit 36 is operative to establish a constant power output mode in the internal combustion engine. This constant power output mode is established by the drive unit 36 which selectively drives the second regulating member 26 to turn in the direction of the arrow $b_2$ and allows the second regulating member 26 to be turned by the force of the spring 28 in the direction of the arrow $a_2$. In this instance, the second linkage cable 48 is caused to lengthwise move selectively in the direction of the arrow $a_4$ or $b_4$ depending upon the direction in which and the distance over which the diaphragm 42 of the drive unit 36 is displaced within the actuator housing 38.

The vacuum chamber 40 of the drive unit 36 communicates with the intake manifold 10 upstream of the throttle valve 12 across a solenoid operated vacuum control valve unit 50 which also forms part of the above mentioned drive means of the apparatus embodying the present invention. The valve unit 50 has a control port communicating with the vacuum chamber 40, a vacuum port communicating with the engine intake manifold 10 and an air port open to the atmosphere and includes at least two valve sections which consist of a first valve section 50a and a second valve section 50b. The first valve section 50a intervenes between the control port and the vacuum port and is adapted to contribute to allow the vacuum chamber 40 of the drive unit 36 to communicate with the intake manifold 10 of the engine. The second valve section 50b intervenes between the control port and the air port and is adapted to allow the vacuum chamber 40 to communicate with the open air. Each of the valve sections 50a and 50b may be of the two-position or "on-off" type but is preferably of the type capable of providing a continuously variable flow rate therethrough.

If desired, the valve unit 50 may have an additional valve section 50c which is responsive to the conditions of the front and rear brake switches 52 of the vehicle. The third valve section 50c is adapted to provide communication provided between the control port and the air port when at least one of the front and rear brake switches is actuated. Between the vacuum valve port of the valve unit 50 and the engine intake manifold 10 may be provided a vacuum reservoir 54 to accumulate vacuum therein.

The solenoid operated valve unit 50 is controlled by an appropriate control circuit 56 electrically connected to the valve unit 50. The control circuit 56 is typically constituted by a microprocessor chip and is supplied with input signals representative of various operational parameters of the vehicle. These signals are assumed to include a signal representative of vehicle speed and signals representative of the conditions of the front and rear brake switches 52 and are supplied from sensors 58. The control circuit 56 is responsive not only to the signals supplied from the sensors 58 but also to a signal supplied from a constant-speed switch 60 which is manually operated to produce a constant-speed instruction signal. The constant-speed instruction signal thus produced by the constant-speed switch 60 is fed to the control circuit 56 and enables the circuit 56 to control the first and second valve sections 50a and 50b of the valve unit 50 to selectively open and close. By such selective actuation of the valve sections 50a and 50b, the vacuum in the vacuum chamber 40 of the drive unit 36 is regulated to deform the diaphragm 42 accordingly.

The displacement of the diaphragm 42 is transmitted through the second linkage cable 48 to the second regulating member 26 of the throttle regulator unit 20 and forces or allows the second regulating member 26 to turn in either of the directions of the arrows $a_2$ and $b_2$ about the axis of the pivot shaft 24. When the second linkage cable 48 is caused to travel in the direction of the arrow $b_4$ with the vacuum chamber 40 of the drive unit 36 contracted with an increased degree of vacuum, the second regulating member 26 is driven to turn in the direction of the arrow $b_2$ against the force of the spring 28. While the second regulating member 26 remains disengaged from the lug portion 30 of the first regulating member 22, the second regulating member 26 is allowed to turn with respect to the first regulating member 22 and is unable to transmit driving force from the linkage cable 48 to the first regulating member 22 which is therefore held in situ. When the second regulating member 26 is thereafter brought into abutment against the lug portion 30 of the first regulating member 22, the second regulating member 26 is inhibited from further turning with respect to the first regulating member 22 so that the first regulating member 22 is caused to turn in the direction of the arrow $b_2$ together with the second regulating member 26. The angular motion of the second regulating member 26 is transmitted through the first linkage cable 34 to the throttle drive member 16 and further through the mechanical linkage 18 to the throttle valve 12 of the engine. The throttle valve 12 is thus driven to turn to a position calculated by the control circuit 56 and produces a constant power output from the internal combustion engine.

When, on the other hand, the throttle-control grip member 14 is manually driven to turn in the direction of the arrow $a_1$ by the vehicle driver who wishes to reduce the vehicle speed, the first linkage cable 34 is caused to lengthwise travel in the direction of the arrow $a_3$. Under this condition, an additional tension is created in the inner wire cable 34a of each section of the linkage cable 34 as indicated by T in FIG. 2. This additional tention T causes each section of the linkage cable 34 to attempt to stretch straight between its ends as indicated by phantom lines in FIG. 2 so that the outer tube 34b is forced to lengthwise shrink and produces a lengthwise compressive force P proportionate to the tension T as also shown in FIG. 2. The above mentioned control circuit 56 of the apparatus embodying the present invention operates on additional signals supplied from a switch device which judiciously utilizes the compressive force P thus created. As will be described, this switch device is characterized by a movable member movable in response to a mechanical stress represented by this compressive force P for producing a signal effective to disable the control signal from the control circuit 56 in the presence of an instruction signal from the constant-speed switch 60.

Figure 3:
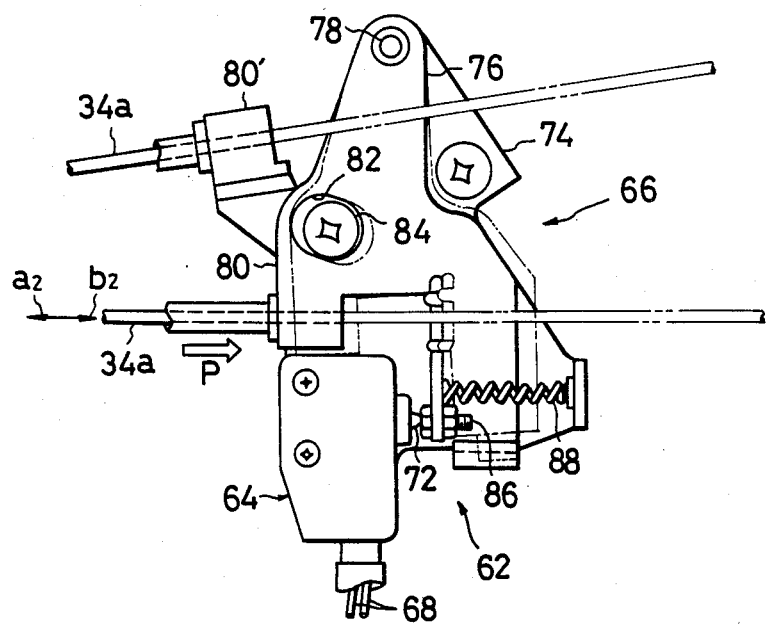
FIG. 3 is a plan view showing a preferred example of a switch device predominant over a constant-speed control circuit also forming part of the apparatus embodying the present invention.

Referring to FIG. 3 of the drawings, such a switch device, designated in its entirety by reference numeral 62 largely comprises a switch unit 64 and a switch actuator unit 66. The switch unit 64 includes leads 68 electrically connected to the control circuit 56 through line represented by a single line 70 in FIG. 1, and a switch element 72 which is movable between a position to provide connection between the leads 68 and a position to disconnect the leads 68 from each other. In the embodiment of the present inventions, the switch unit 64 is assumed to be close when the switch element 72 is depressed and to be open when the switch element 72 is released, for purposes of description.

On the other hand, the switch actuator unit 66 comprises a support member 74 fixedly mounted on the vehicle body and a rockable member 76 which is pivotally supported on the support member 74 by means of a pivot pin 78. The rockable member 76 is formed with a slot 78 slightly elongated arcuately about the center axis of the pivot pin 78. A guide pin 80 projects from the support member 74 and is slidably received in the slot 78. The rockable member 76 is thus permitted to turn with respect to the support member 74 over a distance limited by the length of the slot 78. The rockable member 76 further has a lug portion 84 with which the outer tube 34b of any section of the linkage cable 34 is securely coupled or otherwise operatively engaged at any longitudinal location thereof so that the above mentioned compressive force P to be produced in the tube 34b can be transmitted to the. In the embodiment herein shown, this particular section of the linkage cable 34 is assumed by way of example as being the previously mentioned first section intervening between the throttle-control grip member 14 and the throttle drive member 16 as illustrated in FIG. 1. The inner wire cable 34a which extends through this of this section of the linkage cable 34 extends in such a manner as not to interfere with and not to be influenced by the turning motion of the rockable member 76. The support member 74 has the switch unit 64 also supported thereon.

The rockable member 76 further has an adjustable switch actuating element 86 which is located to be engageable with the switch element 72 of the switch unit 64. This switch actuating element 86 may be integral with the rockable member 76 or formed separately of and attached securely to the member 76 and is shown constituted by a bolt adjustably secured to the rockable member 76 by means of a nut. The rockable member 76 is pivotally movable with respect to the support member 74 in opposite directions indicated by arrows $a_5$ and $b_5$ about the axis of the pivot pin 78. These directions of arrows $a_5$ and $b_5$ of the rockable member 76 respectively correspond to the directions of the arrows $a_5$ and $b_5$ of the movement of the linkage cable 34 and are directions in which the switch actuating element 86 is to be respectively disengaged from and engaged by the switch element 72. The rockable member 76 is urged to turn in the direction of the arrow $a_4$ to depress the switch element 72 by suitable biasing means. This biasing means is shown comprising a helical compression spring 88 seated at one end on a projection of the support member 74 and a projection of the rockable member 76.

If desired, the rockable member 76 may further have a lug portion 84' with which the outer tube 34b of any other section of the linkage cable 34 is coupled or engaged at a suitable longitudinal location thereof. In FIGS. 1 and 3, this second section of the linkage cable 34 is assumed to be the previously mentioned second section intervening between the throttle-control grip member 14 and the second regulating member 26.

In operation, the engine is maintained in a condition producing a constant power output when the control circuit 56 is activated with the signal from the constant-speed switch 60. When the vehicle driver manually turns the throttle-control grip member 14 in the direction of the arrow $a_1$ under this constant-speed driving condition of the vehicle, the inner wire cable 34a of each section of the first linkage cable 34 is caused to travel in the direction of the arrow $a_3$. The throttle drive member 16 is thus forced to turn in the direction to cause the throttle valve 12 of the engine to reduce its degree of opening. The movement of the linkage cable 34 is also transmitted to the second regulating member 26 of the throttle regulator unit 20 and forces the throttle drive member 16 to turn in the direction of the arrow $a_2$. The angular motion of the throttle drive member 16 in turn causes the second linkage cable 48 to move in the direction of the arrow $a_4$ so that the diaphragm 42 of the drive unit 36 is forced to deform in the direction to expand the vacuum chamber 40 against the force of vacuum acting on the diaphragm 42.

As a result of the longitudinal movement of the first linkage cable 34, the inner wire cable 34a of each of the sections of the linkage cable 34 is caused to produce therein an additional tension T, which in turn creates a lengthwise compressive force P in the outer tube 34b enclosing the wire cable 34a as previously discussed. The compressive force P produced in, for example, the first section of the first linkage cable 34 is transmitted to the lug portion 84 of the rockable member 76 of the switch actuator unit 66 shown in FIG. 3 and acts to force the rockable member 76 to turn in the direction of the arrow $a_5$ about the center axis of the pivot pin 78. The rockable member 76 being thus caused turn in the direction of the arrow $a_5$, the switch actuating element 86 on the rockable member 76 is released from the switch element 72 of the switch unit 64, which is accordingly caused to open. The signal thus produced by the switch unit 64 is transmitted to the control circuit 56 through the line 70 and disables the instruction signal from the constant-speed switch 60. The control circuit 56 now terminates its control over the valve unit 50 so that the opening degree of the throttle valve 12 and accordingly the vehicle speed are controlled by the manual effort applied to the throttle-control grip member 14 by the vehicle driver.

The additional tension T produced in the wire cable 34a of each section of the first linkage cable 34 when the throttle-control grip member 14 is manipulated by the vehicle driver is transmitted through the second regulating member 26 of the throttle regulator unit 20 to the wire cable of the second linkage cable 48 and thus creates a lengthwise compressive force P' in the outer tube of the linkage cable 48. A switch device similar to the switch device 62 described above may therefore be provided in association with the second linkage cable 48 to be responsive to the compressive force P' thus produced in the outer tube of the linkage cable 48 as indicated at 62' in FIG. 1. This alternative switch device 62' is used in lieu of the switch device 62 shown in FIG. 3 and need not be provided in addition to or in combination with the switch device 62.

While the second linkage cable 48 in the embodiment hereinbefore described is constructed by the combination of the inner wire cable and the outer tube similarly to the first linkage cable 34, such a linkage cable 48 may be substituted by a rigid rod interconnecting the second regulating member 26 of the throttle regulator unit 20 and the diaphragm 42 of the drive unit 36.

Figure 4:
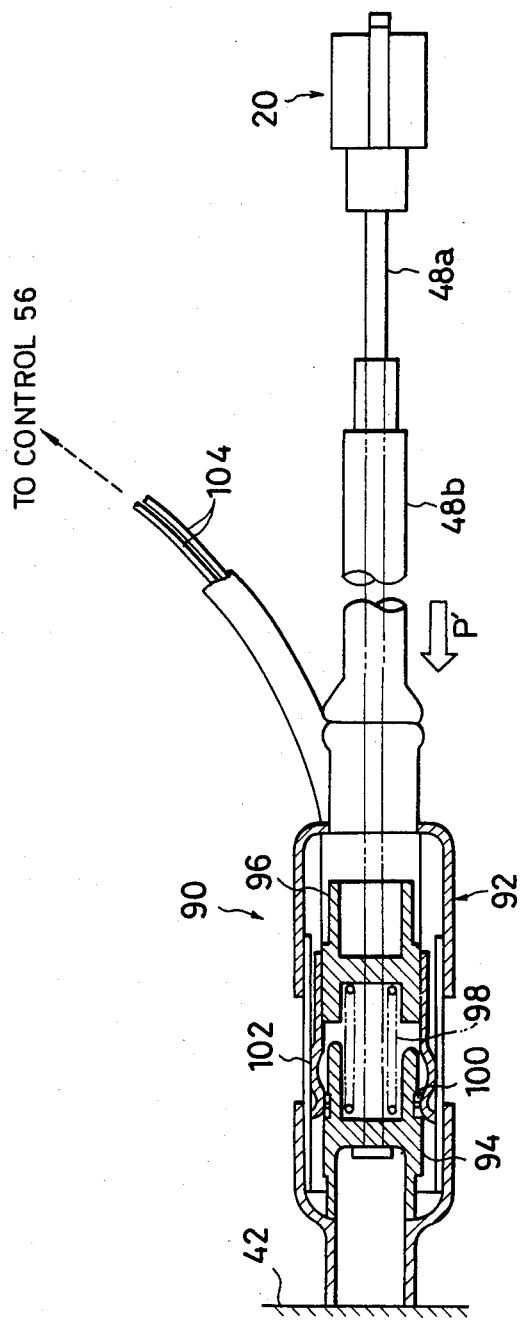
FIG. 4 is a longitudinal sectional view showing a switch device which forms part of a modification of the embodiment shown in FIGS. 1 to 3.

FIG. 4 of the drawings shows part of a modification of the embodiment of the present invention hereinbefore described with reference to FIGS. 1 to 3. In this modified embodiment of a throttle control apparatus according to the present invention, a switch device to cancel the constant-speed control function of the control circuit 56 is provided in conjunction with the second linkage cable 48 intervening between the throttle regulator unit 20 and the vacuum operated drive unit 36 provided in the arrangement shown in FIG. 1.

The switch device, now designated by reference numeral 90, comprises a generally cylindrical hollow casing 92 which is connected at one end to the diaphragm 42 of the vacuum operated drive unit 36 (FIG. 1). The casing 92 is composed of two outer members separate from each other and an electrically non-conductive inner sleeve bridging the outer members. The casing 92 has fixedly supported therein generally cylindrical, electrically non-conductive first and second connecting members 94 and 96 which are axially spaced apart from each other. The first connecting member 94 is securely attached to the casing 92 and the second connecting member 96 is axially movable with respect to the casing 92 toward and away from the first connecting member 94. The connecting members 94 and 96 are urged axially away from each other by suitable biasing means. For this purpose, the connecting members 94 and 96 have concavities open toward each other and have a helical compression spring 98 received in these concavities. The spring 98 has its opposite ends seated on end walls defining the bottoms of the concavities in the elements 94 and 94 so that the second connecting member 96 is urged away from the first connecting member 94. The first contact element 94 has an annular stationary contact element 100 closely received on its outer peripheral surface and, likewise, the second contact element 96 has a generally cylindrical movable contact element 102 closely received on its outer peripheral surface. The movable contact element 102 axially project toward the stationary contact element 100 and is engageable with the contact element 100. The stationary and movable contact elements 100 and 102 are respectively connected to leads 104 which lead to the control circuit 56 shown in FIG. 1.

The second linkage cable 48 leading from the second regulating member 26 of the throttle regulator unit 20 as described with reference to FIGS. 1 to 3 has its inner wire cable 48a anchored at its leading end to the above mentioned end wall of the first connecting member 94 and its outer tube 48b connected at its leading end to the second connecting member 96. In the absence of an additional tension produced in the inner wire cable 48a, the second connecting member 96 is held, with respect to the first connecting member 94, in a predetermined axial position having the movable contact element 102 received on the stationary contact element 100 on the first connecting member 94. When the additional tension is produced in the inner wire cable 48a, a lengthwise compressive force P' is created in the outer tube 48b as previously described in connection with the embodiment of FIGS. 1 to 3. This compressive force P' acts on the second connecting member 96 to axially move toward the first connecting member 94 so that the movable contact element 102 on the former is caused to move beyond the stationary contact element 100 on the latter and causes the switch device 90 to open.

In the embodiment above described, the predetermined position of the second connecting member 96 with respect to the first connecting member 94 may be such that the movable contact element 102 on the connecting member 96 is located ahead of the the stationary contact element 100 on the first connecting member 94 in the absence of a compressive force P' produced in the outer tube 48b of the linkage cable 48. In this instance, the movable contact element 102 is caused to ride on the stationary contact element 100 when the second connecting member 96 is moved toward the first connecting member 94 with the compressive force P' produced in the outer tube 48b of the linkage cable 48.

What is claimed is:

1. A throttle control apparatus for an internal combustion engine for a powered vehicle having in the internal combustion engine an induction system including a throttle valve therein, comprising
   manually operated first throttle valve actuating means rotatable in either direction about an axis fixed with respect to the vehicle body;
   first linkage means for providing driving connection selectively in one of two opposite directions from said first throttle valve actuating means to said throttle valve;
   a control circuit for producing a control signal when actuated;
   drive means responsive to said control signal for producing a driving force in one direction;
   second throttle valve actuating means for providing driving connection from said drive means to said throttle valve;
   second linkage means for transmitting said driving force to said second throttle valve actuating means, one of said first and second linkage means being operative to produce a mechanical stress therein with said first throttle valve actuating means manually operated to provide driving connection to said throttle valve in one of said opposite directions through said first linkage means; and
   switch means including a movable member movable in response to said mechanical stress for producing a signal effective to disable said control signal from said control circuit.

2. A throttle control apparatus as set forth in claim 1, in which said first linkage means comprises an endless, flexible line passed between said first and second throttle valve actuating means, said flexible line comprising a lengthwise non-deformable inner member and a lengthwise elastically deformable outer tube through which said inner member lengthwise slidably extends between said first and second throttle valve actuating means, said outer tube being secured at one lengthwise location thereof to said first throttle valve actuating means and at another lengthwise location thereof to said second throttle valve actuating means so that said outer tube is operative to produce therein a lengthwise compressive force as said mechanical stress between the two lengthwise locations thereof with said first throttle valve actuating means manually operated to provide driving connection to said throttle valve in one of said opposite directions through said flexible line.

3. A throttle control apparatus as set forth in claim 1, further comprising a throttle drive member intervening in effect between said first throttle valve actuating means and said throttle valve and between said second throttle valve actuating means and said throttle valve, said first linkage means being operative to provide driving connection selectively in one of two opposite directions from said first throttle valve actuating means to said throttle valve through said throttle drive member and in said one direction from said second throttle valve actuating means to said throttle drive member.

4. A throttle control apparatus as set forth in claim 3, in which said first linkage means comprises an endless, flexible line passed between said first and second throttle valve actuating means and said throttle drive member, said flexible line comprising a lengthwise non-deformable inner member and a lengthwise elastically deformable outer tube through which said inner member lengthwise slidably extends between said first and second throttle valve actuating means and said throttle drive member, said outer tube being secured at one lengthwise location thereof to one of said first and second throttle valve actuating means and said throttle drive member and at another lengthwise location thereof to one of the remaining two of said first and second throttle valve actuating means and said throttle drive member so that said outer tube is operative to produce therein a lengthwise compressive force as said mechanical stress between the two lengthwise locations thereof with said first throttle valve actuating means manually operated to provide driving connection to said throttle valve in one of said opposite directions through said flexible line.

5. A throttle control apparatus as set forth in claim 1, in which said drive means comprises a movable member movable responsive to said control signal and in which said second linkage means comprises an endless, flexible line passed between said first and second throttle valve actuating means, said flexible line comprising a lengthwise non-deformable inner member and a lengthwise elastically deformable outer tube through which said inner member lengthwise slidably extends between said second throttle valve actuating means and said movable member of said drive means, said outer tube being secured at one lengthwise location thereof to said second throttle valve actuating means and at another lengthwise location thereof to said movable member of said drive means so that said outer tube is operative to produce therein a lengthwise compressive force as said mechanical stress between the two lengthwise locations thereof with said first throttle valve actuating means manually operated to provide driving connection to said throttle valve in one of said opposite directions through said first linkage means.

* * * * *